(12) United States Patent
Morris

(10) Patent No.: US 6,422,359 B1
(45) Date of Patent: Jul. 23, 2002

(54) BRAKE SHOE AND INTERNAL SHOE DRUM BRAKE

(75) Inventor: Roy Morris, Newport (GB)

(73) Assignee: Meritor Heavy Vehicle Braking Systems (UK) Ltd., Berkshire (GB)

( * ) Notice: Subject to any disclaimer, the term of this patent is extended or adjusted under 35 U.S.C. 154(b) by 0 days.

(21) Appl. No.: 09/719,531

(22) PCT Filed: Jun. 16, 1999

(86) PCT No.: PCT/GB99/01908

§ 371 (c)(1),
(2), (4) Date: Feb. 21, 2001

(87) PCT Pub. No.: WO99/66227

PCT Pub. Date: Dec. 23, 1999

(30) Foreign Application Priority Data

Jun. 16, 1998 (GB) .............................................. 9812869

(51) Int. Cl.$^7$ .............................................. F16D 69/00
(52) U.S. Cl. .............................. 188/250 R; 188/250 B; 188/250 G
(58) Field of Search .............................. 188/250 R, 252, 188/257, 250 B, 78, 325, 73.1, 251 M, 251 A, 250 G

(56) References Cited

U.S. PATENT DOCUMENTS

| 2,150,186 A | | 3/1939 | Pope |
| 2,647,592 A | | 8/1953 | Tilden |
| 2,667,948 A | | 2/1954 | Tilden |
| 3,899,050 A | * | 8/1975 | Savary et al. .............. 188/73.1 |

FOREIGN PATENT DOCUMENTS

| DE | 1014445 | 10/1956 |
| DE | 19614268 | 8/1997 |
| EP | 0410510 | 1/1991 |
| GB | 700534 | 12/1953 |
| GB | 1242781 | 5/1968 |
| GB | 1124004 | 8/1968 |
| JP | 08093813 | 12/1996 |

* cited by examiner

*Primary Examiner*—Pam Rodriguez
(74) *Attorney, Agent, or Firm*—Carlson, Gaskey & Olds

(57) ABSTRACT

A brake shoe (1; 2) comprising an arcuate platform (5) carrying a lining (6, 7, 8; 12, 13) of friction material, the lining (6, 7, 12, 13) having, at or adjacent its outer ends, localised portions (9, 10; 14, 15) projecting radially outwardly beyond the remainder of the lining (6, 7, 12, 13).

9 Claims, 1 Drawing Sheet

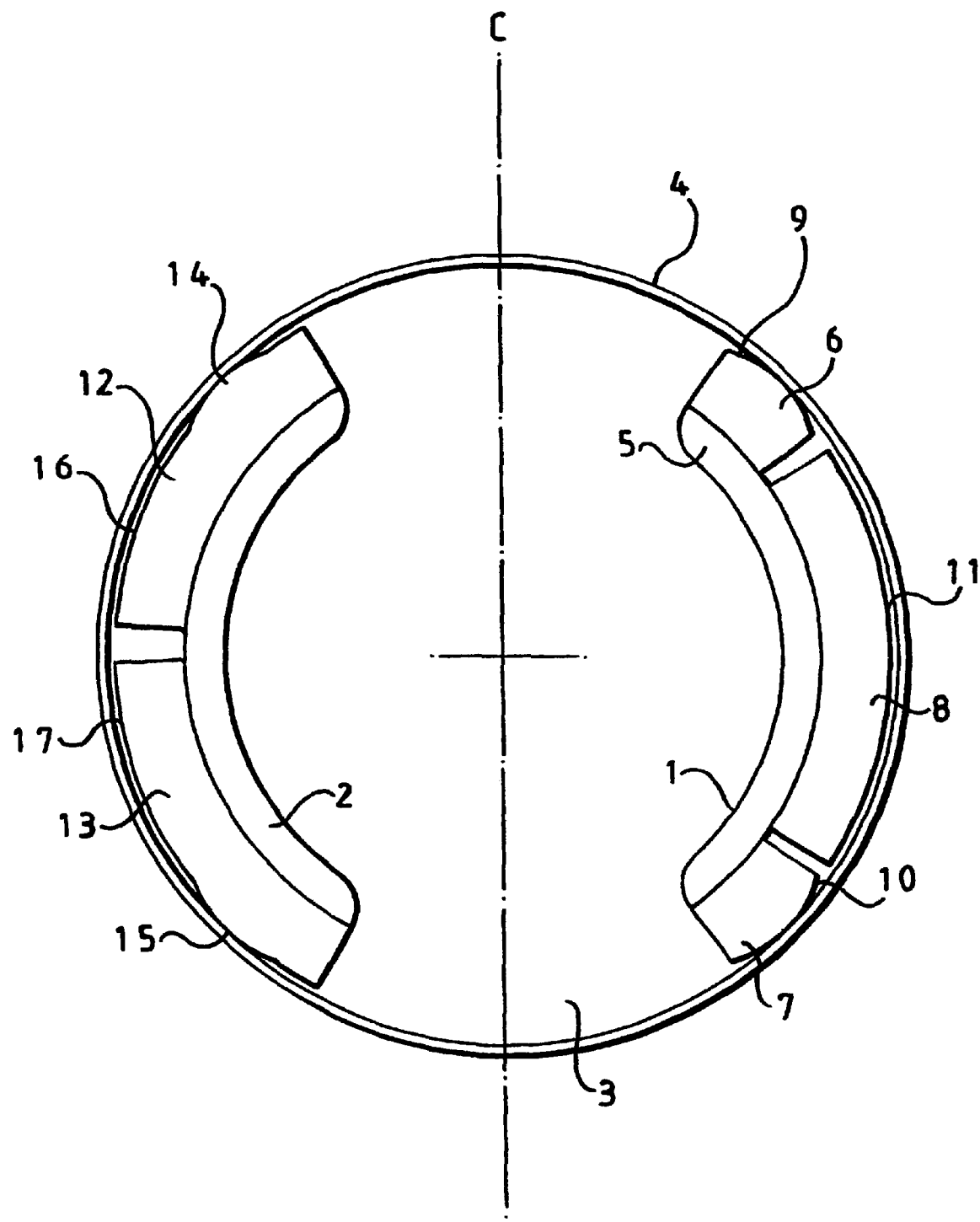

BRAKE SHOE AND INTERNAL SHOE DRUM BRAKE

The present application claims priority to the international application published under the Patent Cooperation Treaty PCT/GB99/01908 filed on Jun. 16, 1999, which in turn claims priority to the Great Britain patent GB 9812869.7 dated Jun. 16, 1998.

BACKGROUND OF THE INVENTION

This invention relates to a brake shoe having an arcuate platform carrying a lining of friction material and intended for use in an internal shoe drum brake, primarily for a motor vehicle, and of the kind having a pair of brake shoes mounted on a back plate and separable by an actuator into braking engagement with a rotary brake drum. The invention also embraces an internal shoe drum brake incorporating a plurality of brake shoes.

Problems during bedding in new brake linings against the braking surface of a rotary brake drum are often due to the occurrence of random high spots on the linings which can give rise, during the bedding in process, to local areas of excessive loading, leading potentially to uneven braking, and/or drum distortion and its resultant brake judder. These problems can occur despite the fact that new linings are often ground to match generally the drum curvature, because production tolerances result in the contact areas of the linings being ill-defined or spaced unevenly around the drum circumference.

SUMMARY OF THE INVENTION

The invention is a brake shoe for an internal shoe drum brake, and a drum brake containing a plurality of such shoes, in which the aforesaid problems are alleviated or avoided, by controlling accurately the formation of the lining to drum contact areas and spacing these areas as evenly as possible around the drum circumference.

According to the invention, a brake shoe comprises an arcuate platform carrying a lining of friction material, the lining having, at or adjacent its outer ends, localised portions projecting radially outwardly beyond the remainder of the lining.

The lining may conveniently be in three separate sections, of which the two outermost ones preferably have convex projecting surfaces having radii of curvature which are, typically, smaller than that of the remaining lining.

With the arrangement of the invention, the sections of lining providing the initial areas of contact between the lining and drum are spaced in a generally balanced manner around the drum, which greatly reduces the risk of drum distortion and resultant brake judder.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1 is plane view of the brake shoe and internal shoe drum brake.

DETAILED DESCRIPTION OF THE PREFERRED EMBODIMENT

The invention will now be described, by way of example, with reference to the accompanying single figure which is a schematic end view, with inessential parts omitted, of one form of the internal shoe drum brake of the invention, two alternative forms of brake shoe being illustrated respectively at either side of a brake centreline.

The brake partially illustrated in FIG. 1 has a pair of brake shoes 1, 2 mounted on a back plate 3 within a rotatable brake drum 4. The usual ancillary equipment, such as actuator and torque sustaining devices, is omitted from the illustrated brake, for simplicity. Moreover, it will be understood that the brake would, in practice, be provided with two identical or similar shoes. However, alternative forms of the shoe of the invention are illustrated respectively at either side of the brake centreline C, for convenience.

The right-hand shoe 1 will be seen to include an arcuate platform represented at 5, which carries three separate sections of lining material, the outer sections 6, 7 extending over a relatively small part of the platform circumference, whereas the central lining section 8 covers a major part of that circumference. The lining sections 6 and 7 have curved operative surfaces 9, 10, of which the radii of curvature are smaller than that of the central section 8, the operative surface 11 of which initially lies slightly radially inwardly of the surfaces 9, 10.

The drawing illustrates the shoe 1 in new condition and applied against the drum braking surface. During braking, the relatively small area braking surfaces 9, 10 will wear and bed in rapidly, increasing their effective areas and the surface 11 of the section 8 will be applied against the drum, either after a short time, following the rapid bedding in of the sections 6 and 7 or possibly simultaneously with those sections under heavy braking loads. It will be seen that the positioning of the sections 6 and 7 effectively spreads the braking load across the drum and prevents any untoward force concentration at other locations. Even when local high spots on the section surface 11 contact the drum, the spreading of the load between such a high spot and the sections 6 and 7 wholly or largely avoids undesireable drum distortion.

The shoe 2 is provided with only two lining sections 12, 13, each of which is formed or ground to provide a respective domed portion 14, 15 projecting radially beyond the remaining surface portions 16, 17 of the sections. The operation of this arrangement is similar to that described previously and the rapid bedding in and location of the projections 14, 15 avoid, or substantially so, untoward drum distortion.

It will be understood that the lining of each shoe may be in a single piece, with appropriate projecting portions formed at or adjacent the free ends of the shoe by a forming or grinding operation. The projecting portions may be of any suitable form other than arcuate, such as will be benefical in promoting rapid bedding in of those portions during initial braking.

In a further alternative arrangement, the lining on each shoe may again be in two parts, one of which constitutes a small section, such as one of those illustrated on the shoe 1, with the other lining part incorporating a further small section and a larger section having the major braking area of the shoe in a single piece. It may alternatively or additionally be possible to form the bedding in surfaces of the projecting portions with ribs or serrations in order further to facilitate the bedding in process.

The foregoing description is exemplary, not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A brake shoe comprising an arcuate platform carrying a lining of friction material, the lining in an unworn condition thereof having a major braking portion including a surface engagable with and generally matching the curvature of the drum and extending between localized braking portions associated with circumferentially outer ends of the lining, the localized braking portions being spaced in a generally balanced manner around the drum and projecting radially outwardly beyond the major braking portion so as to spread braking loads across the drum during bedding in of the lining.

2. A brake shoe as claimed in claim 1, wherein the lining is in three separate sections.

3. A brake shoe as claimed in claim 2, wherein the two outermost lining sections have convex projecting surfaces having radii of curvature which are smaller than that of the remaining lining section.

4. A brake shoe as claimed in claim 1, where the lining is in two separate sections.

5. A brake shoe as claimed in claim 1, wherein the localized portions are provided with ribs or serrations for facilitating bedding in.

6. A brake shoe as claimed in claim 1, wherein the lining is arranged to provide braking contact using a main braking portion immediately following rapid wear of the localized portions.

7. The brake shoe as claimed in claim 1, wherein the localized braking portions are adjacent the circumferentially outer ends of the lining.

8. A method of making a brake shoe including an arcuate platform carrying a lining of friction material, the lining in an unworn condition having a major braking portion including a surface engagable with and generally matching the curvature of the drum and extending between localized braking portions, the radially outer surface of the lining is lightly ground for accurately forming the localized braking portions spaced around the drum and projecting radially outwardly beyond the major braking portion.

9. A brake shoe comprising an arcuate platform carrying three separate sections of a lining of friction material, the lining in an unworn condition thereof having a major braking portion extending between localized braking portions associated with circumferentially outer ends of the lining, the localized braking portions being spaced in a generally balanced manner around the drum and projecting radially outwardly beyond the major braking portion with a radii of curvature smaller than that of the remaining lining section so as to spread braking loads across the drum during bedding in of the lining.

* * * * *